US005724031A

United States Patent [19]

Huang

[11] Patent Number: 5,724,031

[45] Date of Patent: Mar. 3, 1998

[54] METHOD AND KEYBOARD FOR INPUTTING CHINESE CHARACTERS ON THE BASIS OF TWO-STROKE FORMS AND TWO-STROKE SYMBOLS

[76] Inventor: Feimeng Huang, The Agricultural Bank of China Neijiang Branch, 284 Jiao Tong Road Neijiang, Sichuan, China

[21] Appl. No.: 637,715

[22] PCT Filed: Oct. 20, 1994

[86] PCT No.: PCT/CN94/00079

§ 371 Date: May 1, 1996

§ 102(e) Date: May 1, 1996

[87] PCT Pub. No.: WO95/12842

PCT Pub. Date: May 11, 1995

[30] Foreign Application Priority Data

Nov. 6, 1993 [CN] China .............................. 93115373.5

[51] Int. Cl.$^{6}$ .............................. H03M 11/00

[52] U.S. Cl. .............................. 341/28; 345/171; 395/797; 400/484; 400/110

[58] Field of Search .............................. 341/28; 400/110, 400/484; 345/171; 395/797

[56] References Cited

U.S. PATENT DOCUMENTS

| | | | |
|---|---|---|---|
| 4,500,872 | 2/1985 | Huang | 341/28 |
| 4,559,615 | 12/1985 | Goo | 400/110 |
| 4,684,926 | 8/1987 | Yong-Min | 400/110 |
| 4,920,492 | 4/1990 | Wang | 400/110 |
| 5,084,003 | 1/1992 | Susic . | |
| 5,131,766 | 7/1992 | Wong | 400/110 |
| 5,187,480 | 2/1993 | Thomas | 341/28 |
| 5,197,810 | 3/1993 | Zhang | 400/110 |
| 5,212,038 | 5/1993 | Bernath | 341/28 |
| 5,319,386 | 6/1994 | Gunn | 400/110 |
| 5,360,343 | 11/1994 | Tang | 400/110 |
| 5,475,767 | 12/1995 | Du | 400/110 |

FOREIGN PATENT DOCUMENTS

| | | |
|---|---|---|
| 1049920A | 3/1991 | China . |
| 1068204A | 1/1993 | China . |
| 0 356 594 A1 | 3/1990 | European Pat. Off. . |
| 0 488 850 A3 | 6/1992 | European Pat. Off. . |

*Primary Examiner*—Jeffery Hofsass
*Assistant Examiner*—Albert K. Wong
*Attorney, Agent, or Firm*—Fish & Richardson P.C.

[57] ABSTRACT

The present invention relates to a method and a keyboard for inputting Chinese characters, which can input both simplified Chinese characters and their original complex forms.

The invention defines 25 double strokes of the kind and 25–28 auxiliary roots containing the double strokes as codes for inputting Chinese characters, further, the invention also defines 25 common use words. Three methods for inputting Chinese characters will be disclosed in the invention. In the input method of which 4 simple shape codes will be used for the coding, a word that can be leaved each other may be broken down into 2 blocks and then 2 codes respective of the first and last double strokes or roots containing the double strokes of each block will be taken into the coding. The inputting methods of the invention are simple and easy for studying.

4 Claims, 2 Drawing Sheets

| | | |
|---|---|---|
| 、 乙 P 大 | ··· 辶 | ／ |
| ヽ丶 O | ー丶 L 日子 | · |
| ノ I 丶 | ーノ K 木 | · |
| ー U 入廴 | ー J 艹 | ー乙 M 小 |
| ー丨 Y 廾 | ー丨 H 勹 | N 口 |
| ノ丨 T | 丨丨 G | 乙丨 B 火 |
| ノー R | 丨ー F | 乙ー V 山 |
| ノノ E 月 | 丨ノ D 攵 | 乙ノ C 土 |
| ノ丶 W | 丨丶 S 扌乂田 | 乙丶 X 纟 |
| ノ乙 Q | 丨乙 A 虫立 | 乙乙 Z 十 |

| ノ乙 P 大 | 八 ; 金 辶 鳥 | ノ |
|---|---|---|
| ヽヽ O | ー、 L 日扌 | 、 |
| ゝヽ I ヽ | ーノ K 木 | 、 |
| ーヽ U 阝 | ー一 J 艹 | ーノ M 小 |
| ーノ Y 工 | ー丨 H ク | N 口 |
| ノ丨 T | 丨丨 G | ノ丨 B 火 |
| ヽ一 R | 丨一 F | ノ一 V 山 |
| ゝヽ E 月 | 丨ノ D 犬 | ノゝ C 土 |
| ヽヽ W | 丨ヽ S 扌乂田 | ノヽ X 毛 |
| ゝ乙 Q | 丨乙 A 虫立 | ノ乙 Z 十 |

METHOD AND KEYBOARD FOR INPUTTING CHINESE CHARACTERS ON THE BASIS OF TWO-STROKE FORMS AND TWO-STROKE SYMBOLS

FIELD OF THE INVENTION

The present invention relates to a method and a keyboard for inputting Chinese characters, which can input both simplified Chinese characters and their original complex forms.

BACKGROUND OF THE INVENTION

So far there are many methods for inputting Chinese characters, for example, Five-Stroke Character Form Code, Nature Code, etc. Most of the stroke-form codes and the combination codes of phoneme and stroke-form are difficult to learn and to bear in mind. The crucial question is that they are limited in the encoding method using radicals which are structural components of Chinese characters, so it is difficult for them to avoid the following shortcomings:

1. There are many, up to hundreds of, encoding elements. For example, Five-Stroke Character Form Code has more than 190 encoding elements, Nature Code has more than 250 encoding elements, Four-stroke Phoneme And Stroke-form Code has more than 440 encoding elements, both of Two-stroke Phoneme And Stroke-form Code and Zheng Code have up to 540 encoding elements, and Taiji Code has 152 encoding elements only in so far as the elements of pictographic character elements and mere character elements for exemplification(it is difficult to count up the actual total number of its encoding elements). Because of the large number of encoding elements, users have to remember a large amount when they learn to use these encoding methods.
2. The encoding rules are very complex. Since there are many encoding elements, it is not clarified how a character can be broken down into encoding elements. For example, Chinese character "天" can be either broken down into "一大" or "二人". The rules for breaking down Chinese characters are very complicated and the theories thereof are not easy to understand. The rules for encoding and the corresponding keyboard arrangements of the encoding elements are also very complicated.
3. The codes are long. At present all the input methods which have lower rate of duplication codes and which can realize blind typing(typing without looking at the display) are four-code input methods, and the long codes cause the increasing of thinking levels for encoding a character and increasing the number of key-striking times, as well as the slowing down of input speed.
4. Their applications are limited in scope. Normally, the encoding methods now available are applicable only to a small collection of Chinese characters, e.g. 6763 Chinese characters in Chinese National Standard GB2312-80, but not applicable to a collection with 20,902 Chinese characters in the international standard ISO-10646 for China, Japan and Republic of Korea. When applying to the ISO-10646 Chinese character collection, it is difficult to encode the phoneme codes in the combination codes of phoneme and stroke-form because there are a large number of Chinese characters, which people do not know their pronunciation, in this large character collection, and it is also very difficult to avoid the high rate of duplication codes or the increase of code length when using mere stroke-form codes, therefore it causes inconvenience to the users.

SUMMARY OF THE INVENTION

The object of the present invention is to provide a method and a keyboard for inputting Chinese characters based on the two-stroke forms and two-stroke symbols which are used as basic codes for encoding Chinese characters. It is easy to learn to use and can be inputted with high speed, therefore it overcomes the disadvantages of the prior arts.

The keyboard of the present invention is realized by setting up keys corresponding to 25 two-stroke form code elements and 25 to 28 two-stroke symbol code elements and a code ending key on a standard keyboard.

Said two-stroke form code elements include:

| | | | | |
|---|---|---|---|---|
| 一一 | 一丨 | 一丿 | 一＼ | 一ㄥ |
| 丨一 | 丨丨 | 丨丿 | 丨＼ | 丨ㄥ |
| 丿一 | 丿丨 | 丿丿 | 丿＼ | 丿ㄥ |
| ＼一 | ＼丨 | ＼丿 | ＼＼ | ＼ㄥ |
| ㄥ一 | ㄥ丨 | ㄥ丿 | ㄥ＼ | ㄥㄥ |

The above two-stroke form code elements are arranged in three lines, with each line has at most 10 elements. The 5 elements beginning with a "horizontal" stroke are marked on the left 5 keys of the middle line; the 5 elements beginning with a "vertical" stroke are marked on the right 4 keys of the middle line, and the second right key of the lower line; the 5 elements beginning with a "left-falling" stroke are marked on the left 5 keys of the upper line; the 5 elements beginning with a "right-falling" stroke are marked on the right 5 keys of the upper line; and the 5 elements beginning with a "turning" stroke are marked on the left 5 keys of the lower line.

The code elements of said two-stroke symbols are:

日月人工木 王〈大虫立扌 乂田又ク艹疒辶 十钅 土山火口小

If necessary, three code elements can be added to the code elements of said two-stroke symbols as follows:

八、金、馬

Said two-stroke symbol code elements are arranged on corresponding keys according to the principle of minimizing the rate of duplication codes.

The Chinese character inputting method of the present invention includes following steps:

1. composing 25 two-stroke form code elements according to the basic strokes which construct Chinese characters, that is:
   classifying the single strokes which construct Chinese characters into five types: horizontal, vertical, left-falling, right-falling and turning, which can be symbolized as:
   一，丨，丿，＼，ㄥ;
   combining every two of the above five strokes together to compose two-stroke form code elements, the total number of which are 5*5=25, and which are provided as follows:

| | | | | |
|---|---|---|---|---|
| 一一 | 一丨 | 一丿 | 一\ | 一ㄥ |
| 丨一 | 丨丨 | 丨丿 | 丨\ | 丨ㄥ |
| 丿一 | 丿丨 | 丿丿 | 丿\ | 丿ㄥ |
| \一 | \丨 | \丿 | \\ | \ㄥ |
| ㄥ一 | ㄥ丨 | ㄥ丿 | ㄥ\ | ㄥㄥ |

2. selecting following 25 two-stroke symbol code elements among frequently used basic structural components of Chinese characters:

日月人工木彐巛大虫立扌乂田又夕艹疒辶十钅土山火口小

If necessary, the following additional elements can be further selected:

八、金、鸟;

3. performing operations for inputting Chinese characters in following 3 manners:
   i. for a character of four strokes or fewer, extracting the first and the last code elements of the character according to the handwriting sequence; for a single block character of 5 strokes or more, extracting the first, the second and the last code elements of the character; for a character which is made up of separated blocks and has 5 strokes or more, dividing it into two blocks, and extracting only the first code elements from the beginning block and the first and the last code elements from the end block, then striking the keys corresponding to these code elements; if the number of the code elements extracted is less than 3, striking the code ending key thereby completing the input of this Chinese character.
   ii. for a character of four strokes or fewer, extracting the first and the last code elements of the character according to the handwriting sequence; for a single block character of 5 strokes or more, extracting the first, the second and the last code elements of the character; for a character which is made up of separated blocks and has 5 strokes or more, dividing it into two blocks, and extracting the first and the last code elements from each block, then striking the keys corresponding to these code elements. If the number of the code elements is less than 4, striking the code-ending key thereby completing the input of this Chinese character.
   iii. for a character of 4 strokes or fewer, extracting the first letter from its standard phonetic alphabet combination, and the first code element of the character according to the handwriting sequence; for a character of 5 strokes or more, extracting the first letter of the standard phonetic alphabet combination, the first code element and last code element of this character, then striking the keys corresponding to these letters and code elements. If the number of the code elements is less than 3, striking the code-ending key thereby completing the input of this Chinese character.

DETAILED DESCRIPTION OF THE PREFERRED EMBODIMENT

The embodiments of the present invention will be described in detail with reference to the drawings hereinafter.

Chinese characters are made up of about 30 kinds of single strokes, which are classified in the present invention into five types: horizontal, vertical, left-falling, right-falling and turning, and symbolized as:

一丨丿\ㄥ

Every two of said five types of stroke are combined together to form a code element of the two-stroke form, thus there are altogether 5*5=25 two-stroke form code elements, which are shown as follows:

| | | | | |
|---|---|---|---|---|
| 一一 | 一丨 | 一丿 | 一\ | 一ㄥ |
| 丨一 | 丨丨 | 丨丿 | 丨\ | 丨ㄥ |
| 丿一 | 丿丨 | 丿丿 | 丿\ | 丿ㄥ |
| \一 | \丨 | \丿 | \\ | \ㄥ |
| ㄥ一 | ㄥ丨 | ㄥ丿 | ㄥ\ | ㄥㄥ |

In order to enhance the efficiency for inputting Chinese characters and decrease the duplication codes, 25 two-stroke symbols are provided in the present invention as code elements. All the 25 two-stroke symbols are selected among the traditional Chinese character components and combinations of frequently used strokes by means of a number of tests. Using them can decrease the rate of duplication codes effectively. The actual strokes of a two-stroke symbol may have more than two stroke, but they all are deemed as having two stokes in the present invention, thus being so called two-stroke symbols. For example, Chinese character "𠄟" is defined as a two-stroke symbol, which has 4 strokes in reality, according to the present invention, therefore Chinese character "林" is deemed as having 4 strokes. The purpose is to make the encoding rules simple, clear, easy to learn and to bear in mind. These 25 two-stroke symbols are:

日月人工木彐巛大虫立扌乂田又夕艹疒辶十钅土山火口小

According to different requirements of different object characters, some changes may be made on the basis of these 25 two-stroke symbols, for example, the following 3 code elements may be added:

八、金、鸟

Figure 1:
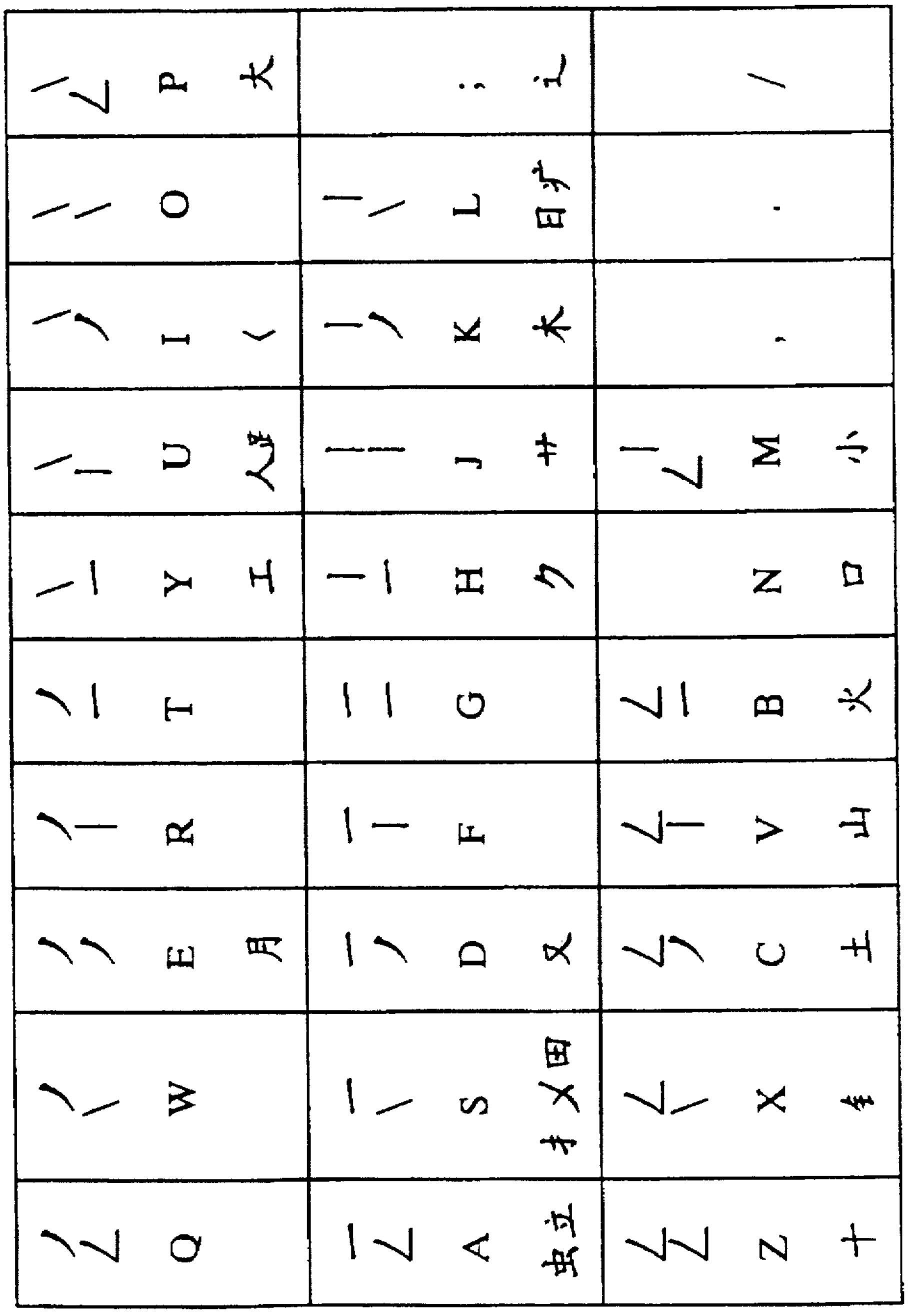
FIG. 1 is a schematic diagram of the keyboard on which 25 two-stroke forms and 25 two-stroke symbols are marked according to the present invention.

Said 25 two-stroke forms and 25 two-stroke symbols are the code elements which are selected by the present invention for inputting Chinese characters. They are marked on the surfaces of 25 keys, as shown in FIG. 1.

On the basis of the 50 code elements, the present invention provides three kinds of methods for inputting Chinese characters: Four Code Input Method based on Mere Stroke-form (hereinafter referred to as MSFC input method); Three Code Input Method based on Mere Stroke-form (hereinafter referred to as MSTC input method); and Three Code Input Method based on the Combination Of Phoneme and Stroke-form (hereinafter referred to as CPSTC input method), wherein as the most important one of the three input methods, the MSFC input method comprises the following steps: dividing a Chinese character into two half-block characters; extracting the first and the last code elements from both half-block characters, totally 4 code elements, according to the handwriting sequence, then striking the keys corresponding to these 4 code elements, thereby completing the input of said Chinese character.

In the present invention, during extracting code elements from a character or a half-block character, the principle of "two-stroke symbol comes first, two-stroke form second" must be abided by. That is to say, if a two-stroke symbol can be extracted, this two-stroke symbol, instead of the two-stroke form, must be extracted. Only if the strokes of a part of a Chinese character do not form any two-stroke symbol, can 2 single strokes thereof be extracted to form a two-stroke form code element. For example, the first code element of Chinese character "最" must be a two-stroke symbol "日", instead of a two-stroke form "丨∠", because the two-stroke symbol "日" is formed from the first stroke of the character, On the other hand, the first code element of Chinese character "戴" must be "戴", instead of "戈", because "戈" is not a two-stroke symbol defined in the present invention. The correct sequence of handwriting must be followed when code elements are extracted.

Chinese characters are classified into two types in MSFC or MSTC input method. One is called single-block characters, the other is called separated-block characters. When a separated-block character is inputted, it must be divided into two parts, the first one is called "the beginning block", the second one is called "the end block".

Separated-block characters are broken down in following manner:

i. For a character of Up-down construction, the group of strokes which are first completed from left to right in handwriting sequence is referred to as the beginning block, and the residual strokes form the end block, e.g., for Chinese character "笔", the first group of strokes which are written from left to right is "⺮", therefore "⺮" is the beginning block, and "毛" is the end block.

ii. For a character of Left-right construction, the group of strokes which are first completed from top to bottom in handwriting sequence is referred to as the beginning block, and the residual strokes form the end block, e.g., for character "鞭", the first group of strokes which are written from top to bottom is "革", therefore "革" is the beginning block, and "便" is the end block.

iii. For a character of Embracing construction, which means a group of strokes embracing another group of strokes from two, three or four directions of the character, and can be divided into a embracing block and a embraced block, the group of strokes which are completed first in handwriting sequence is referred to as the beginning block, the residual strokes form the end block. For example, for character "周", "冂" is the block which are first written, therefore it is the beginning block, and the rest part "吉" is the end block.

iv. Characters other than the above three kinds of constructions are single-block characters.

Said MSFC, MSTC and CPSTC are names of three kinds of input methods of Chinese character in the present invention, wherein "Four Code" or "Three Code" does not represent the actual times of key-striking for each character, but means that at most four codes or three codes are provided for inputting a character. The MSFC and the MSTC inputting method will be described in detail below.

i. for a character of 4 strokes or fewer, extracting the first and the last code elements in handwriting sequence, and striking the keys corresponding to these elements successively.

ii. for a single-block character of 5 strokes or more, extracting the first, the second and the last code elements, and striking the corresponding keys successively.

iii. for a separated-block character of 5 strokes or more, dividing it into two blocks, extracting the first and the last code elements from each block, totally 4 code elements (for MSFC input method) or extracting only the first code element from the beginning block and the first and the last code elements from the end block, totally 3 code elements(for MSTC input method), then striking the corresponding keys successively.

For the above-mentioned MSTC input method, the code-ending key shall be struck when the number of the code elements is less than 3. For the above-mentioned MSFC input method, the code-ending key shall be struck when the number of the code elements is less than 4.

For example, the selected code elements of character "鞭" are "艹, 一丨, 丿丨, 丿\" (for MSFC) or "艹, 丿丨, 丿\" for (MSTC).

Using CPSTC input method according to the present invention, a Chinese character is inputted in a manner as follows:

a) for a character of 4 strokes or fewer, extracting the first letter of the standard combination of the phonetic alphabet and the beginning code elements of the character, then striking the corresponding keys and the code-ending key successively.

b) for a character of 5 strokes or more, extracting the first letter of the standard combination of the phonetic alphabet, the beginning code element and the end code element, then striking the corresponding keys successively.

For example, the selected code elements of character "鞭" are "B, 艹, 丿\" in the CPSTC input method.

The MSFC input method is mainly used for encoding and inputting the characters of a large Chinese character collection including several ten thousand of characters.

The MSTC or CPSTC are mainly used for encoding and inputting commonly used Chinese characters the number of which is less than ten thousand.

The table below shows preferred embodiments of the input method according to the present invention based on the 25 two-stroke forms and the 25 two-stroke symbols.

Preferred embodiments of the input method using 25 two-stroke forms and 25 two-stroke symbols:

| Chinese Character | Input Method | Number of Strokes | Construction | Blocks divided | Extracting code elements | Corresponding keys of Alphabet Keyboard |
|---|---|---|---|---|---|---|
| 下 | CPSTC | <4 | | | X、 一丨 | XF |
| | MSTC | | | | 一丨、丨㇏ | FL |
| | MSFC | | | | 一丨、丨㇏ | FL |
| 毛 | CPSTC | =4 | | | M、 丿一 | MT |
| | MSTC | | | | 丿一、一ㄥ | TA |
| | MSFC | | | | 丿一、一ㄥ | TA |
| 林 | CPSTC | =4 | | | L、 木 | LK |
| | MSTC | | | | 木、木 | KK |
| | MSFC | | | | 木、木 | KK |
| 未 | CPSTC | =5 | single block | | W、 一一、八 | WGW |
| | MSTC | | | | 一一、丨丿、八 | GKW |
| | MSFC | | | | 一一、丨丿、八 | GKW |
| 我 | CPSTC | >5 | single block | | W、 丿一、八 | WTW |
| | MSTC | | | | 丿一、丨一、八 | THW |
| | MSFC | | | | 丿一、丨一、八 | THW |
| 笔 | CPSTC | >5 | seperated-blocks (Up-down construction) | 竹、毛 | B、 丿一、一ㄥ | BTA |
| | MSTC | | | | 丿一、丿一、一ㄥ | TTA |
| | MSFC | | | | 丿一、一㇏、丿一、一ㄥ | TSTA |
| 鞭 | CPSTC | >5 | seperated blocks (Left-right construction) | 革、便 | B、 艹、八 | BJW |
| | MSTC | | | | 艹、丿丨、八 | JRW |
| | MSFC | | | | 艹、一丨、丿丨、八 | JFRW |
| 扇 | CPSTC | >5 | seperated blocks (Embracing construction) | 户、羽 | B、 ㇏ㄥ、丨丨 | BPJ |
| | MSTC | | | | ㇏ㄥ、丨ㄥ、丨丨 | PMJ |
| | MSFC | | | | ㇏ㄥ、一丿、丨ㄥ、丨丨 | PDMJ |
| 禁 | CPSTC | >5 | seperated blocks (Up-down construction) | 林、示 | J、 木、 小 | JKM |
| | MSTC | | | | 木、一一、小 | KGM |
| | MSFC | | | | 木、木、 一一、小 | KKGM |

With 25 two-stroke forms and 25 two-stroke symbols as code elements, the input method of the present invention are applicable to small Chinese character collection of 6,763 characters of Chinese national standard GB2312-80.

With 25 two-stroke forms and 28 two-stroke symbols as code elements, the input method of the present invention are applicable not only to the large character collection of 20,902 Chinese characters of ISO-10646, which includes simplified Chinese characters, their original complex forms, Japanese and Korean characters, but also to the large character collection of 60 thousand Chinese characters.

A special keyboard arrangement suitable for the input methods according to the present invention is provided.

The keyboard comprises at least 25 keys corresponding to the code elements, and a code-ending key. The spacebar of the keyboard shown in the Figures can be used as the code-ending key. These 25 keys are arranged in three lines, with each line has at most 10 keys. 25 two-stroke forms are marked on these 25 keys respectively. The 5 two-stroke forms beginning with a horizontal stroke are marked on the left 5 keys of the middle line. The 5 two-stroke forms beginning with a vertical stroke are marked on right 4 keys of the middle line, and the second right key of the lower line. The 5 two-stroke forms beginning with a left-falling stroke are marked on the left 5 keys of the upper line. The 5 two-stroke forms beginning with a right-falling stroke are marked on the right 5 keys of the upper line. The 5 two-stroke forms beginning with a turning stroke are marked on the left 5 keys of the lower line.

25 to 28 two-stroke symbols are marked on certain keys. Some of the keys are marked with multiple two-stroke symbols, while some of them with none.

The two-stroke form code elements and the two-stroke symbol code elements must be arranged in the keyboard according to the following combination rule:

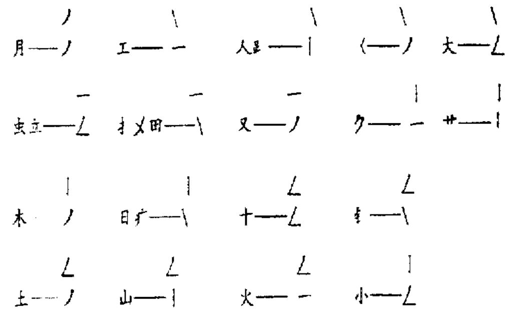

辶-(Without two-stroke symbol) 口-(Without two-stroke symbol)

When two-stroke symbol code elements 人,金,鸟 are added, these three code elements are marked on the same key with code element "辶".

Figure 2:
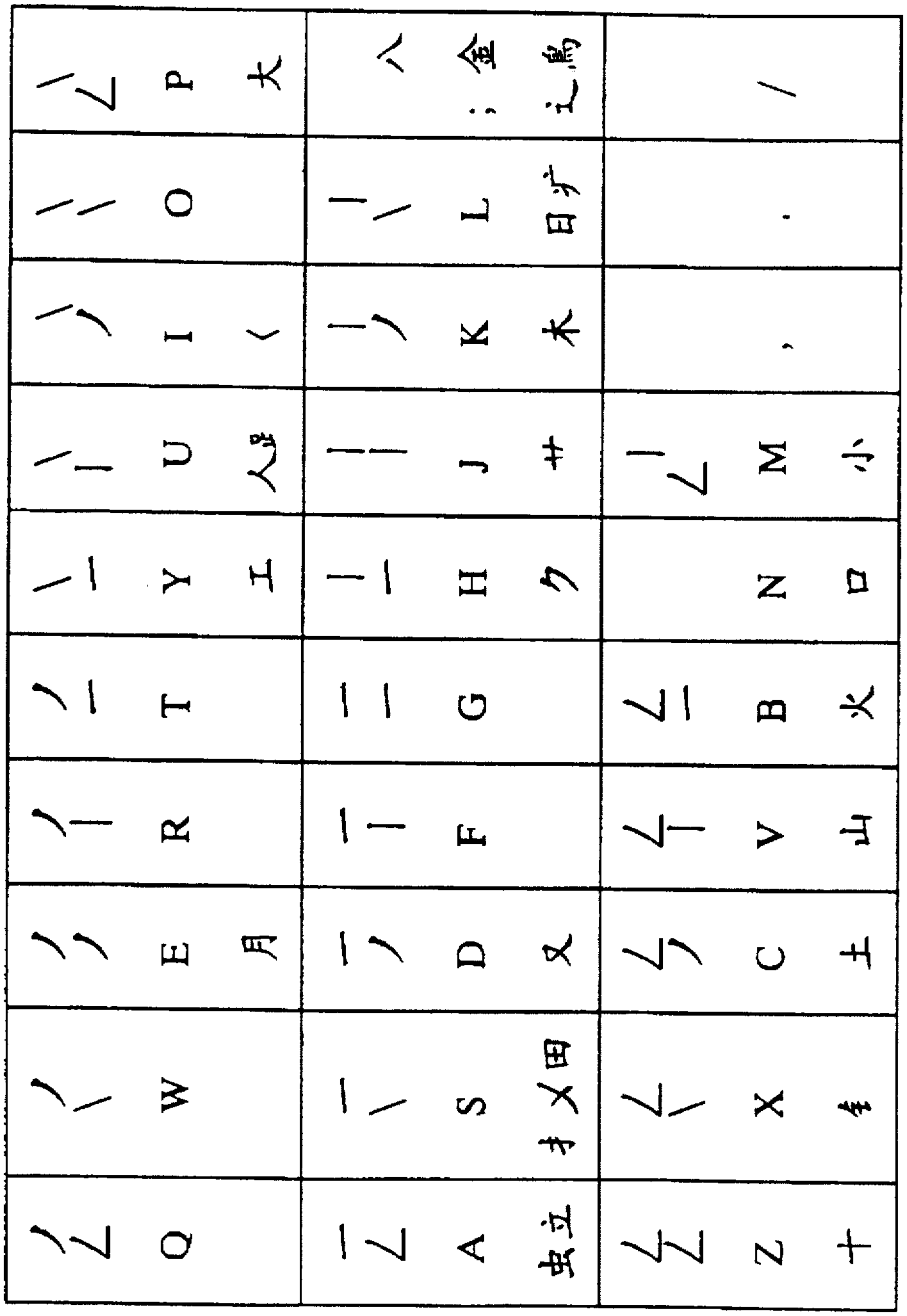
FIG. 2 is a schematic diagram of the keyboard on which 25 two-stroke shapes and 28 two-stroke symbols are marked according to the present invention.

FIGS. 1 and 2 further provide the details of the keyboard in which 25 or 28 two-stroke symbol code elements and 25 two-stroke form code elements are arranged.

The above-mentioned keyboard is the preferred arrangement derived according to the structural features of Chinese characters, and having passed a number of encoding tests, and decreasing the rate of duplication codes greatly.

Because the present invention uses 25 two-stroke forms as the basis for encoding and combined with 25 two-stroke symbols, it breaks through the limit of the encoding method based upon components of Chinese characters, therefore it has following significant advantages as compared with prior arts:

i. The encoding elements are greatly decreased. As code elements, there are only 25 two-stroke forms which are made up of "– | ノ\ ㄥ" and 25 to 28 two-stroke symbols selected from frequently used character components. The amount of symbols which must be remembered is decreased by a factor of 8 to 20. So it is easy to learn and to remember for the operators.

ii. The encoding rules are simple. Because only the beginning and the end strokes or parts of characters are used for encoding, it is simple, clear and overcomes the problems occurred when characters are broken down in the prior arts.

iii. There are fewer codes as compared with prior arts. For small Chinese character collection of less than 10 thousand of characters, only three codes are used for inputting. It is one code fewer than that of prior arts. Using fewer codes cause the decrease of thinking levels for encoding a character and therefore decrease the times of key-striking.

iv. It can be applied more widely. The present invention can apply to encoding of Chinese, Japanese and Korean characters using the same methods and the same code elements. It can also encoding characters in ISO-10646 collection of characters world-wide used and in large collection of Chinese characters which has more than 60 thousand characters.

INDUSTRIAL APPLICABILITY

Because the 25 two-stroke symbols used in the present invention have an ability to greatly decrease the rate of duplication codes, the present invention has very low rate of duplication code. Among 20,902 Chinese characters in international standard ISO-10646, more than 17,000 of them can be directly inputted by MSFC input method of the present invention without having to select from characters represented by same codes. Among 6,763 Chinese characters in Chinese national standard GB2312-80, more than 5,000 of them can be inputted directly by CPSTC input method of the present invention without having to select from characters represented by same codes. In addition, since the default mode that frequently used characters are of priority are used, most of the characters that must be inputted through selection are rarely used words, characters that have to be selected from several characters represented by same codes are rarely met during ordinary inputting. Therefore, the present invention is not only easy to learn, but also can realize blind-typing with very high speed.

What is claimed is:

1. A keyboard for inputting Chinese characters on the basis of two-stroke forms and two-stroke symbols, wherein said keyboard is a standard keyboard on which keys for 25 two-stroke form code elements, keys for 25 to 28 two-stroke symbol code elements and a code-ending key are arranged; and wherein said two-stroke form code elements include:

| | | | | |
|---|---|---|---|---|
| –– | –\| | –ノ | –\ | –ㄥ |
| \|– | \|\| | \|ノ | \|\ | \|ㄥ |
| ノ– | ノ\| | ノノ | ノ\ | ノㄥ |
| \– | \\| | \ノ | \\ | \ㄥ |
| ㄥ– | ㄥ\| | ㄥノ | ㄥ\ | ㄥㄥ |

all of the above two-stroke form code elements are arranged in three lines, with each line having at most 10 code elements; and the 5 code elements beginning with a horizontal stroke are marked on the left 5 keys of the middle line;

the 5 code elements beginning with a vertical stroke are marked on the right 4 keys of the middle line and the second right key of the lower line;

the 5 code elements beginning with a left-falling stroke are marked on the left 5 keys of the upper line;

the 5 code elements beginning with a right-falling stroke are marked on the right 5 keys of the upper line; and the 5 code elements beginning with a turning stroke are marked on the left 5 keys of the lower line, said two-stroke symbol code elements are:

日月人工木阝〈大虫立扌乂田又ク艹疒辶十钅土山火口小 and following three code elements can be added as two-stroke symbol code elements when necessary:

八、金、鳥;

said two-stroke form code elements and said two-stroke symbol code elements are arranged on the keyboard in accordance with the following combination relations:

| | | | | | | | | | |
|---|---|---|---|---|---|---|---|---|---|
| ノㄥ | ノ\ | ノノ | ノ\| | ノ– | \– | \\| | \ノ | \\ | \ㄥ |
| Q | W | E | R | T | Y | U | I | O | P |
| | | 月 | | | 工 | 人阝 | 〈 | | 大 |
| –ㄥ | –\ | –ノ | –\| | –– | \|– | \|\| | \|ノ | \|\ | |
| A | S | D | F | G | H | J | K | L | ; |
| 虫立 | 扌乂田 | 又 | | | ク | 艹 | 木 | 日疒 | 辶 |
| ㄥㄥ | ㄥ\ | ㄥノ | ㄥ\| | ㄥ– | | \|ㄥ | | | |
| Z | X | C | V | B | N | M | , | . | / |
| 十 | 钅 | 土 | 山 | 火 | 口 | 小 | | | |

and, when two-stroke symbol code elements "八, 金, 鳥" are added:

| | | | | | | | | | |
|---|---|---|---|---|---|---|---|---|---|
| ノㄥ | ノ\ | ノノ | ノ\| | ノ– | \– | \\| | \ノ | \\ | \ㄥ |
| Q | W | E | R | T | Y | U | I | O | P |
| | | 月 | | | 工 | 人阝 | 〈 | | 大 |
| –ㄥ | –\ | –ノ | –\| | –– | \|– | \|\| | \|ノ | \|\ | 八 |
| A | S | D | F | G | H | J | K | L | ; 金 |
| 虫立 | 扌乂田 | 又 | | | ク | 艹 | 木 | 日疒 | 辶鳥 |
| ㄥㄥ | ㄥ\ | ㄥノ | ㄥ\| | ㄥ– | | \|ㄥ | | | |
| Z | X | C | V | B | N | M | , | . | / |
| 十 | 钅 | 土 | 山 | 火 | 口 | 小 | | | |

2. A method for inputting Chinese characters using the keyboard according to claim 1, comprising the following steps:

i. composing 25 two-stroke form code elements based upon the basic strokes which construct Chinese characters, that is, classifying the single strokes which Chinese characters into 5 types: horizontal, vertical, left-falling, right-falling and turning strokes, which can be symbolized as – | ノ\ ㄥ; and combining every two of said 5 types of strokes together 'to form two-stroke form code elements, the number of which are altogether 5*5=25, and which are represented as

| | | | | |
|---|---|---|---|---|
| —— | —\| | —ノ | —\ | —ㄥ |
| \|— | \|\| | \|ノ | \|\ | \|ㄥ |
| ノ— | ノ\| | ノノ | ノ\ | ノㄥ |
| \— | \\| | \ノ | \\ | \ㄥ |
| ㄥ— | ㄥ\| | ㄥノ | ㄥ\ | ㄥㄥ |

ii. selecting the following 25 two-stroke symbol code elements from the frequently used basic components of Chinese characters:

日月人工木 阝く大虫立扌乂田又ク艹疒辶 十钅 土山火口小 and adding three two-stroke code elements when necessary as follows:

八、金、鳥;

iii. performing input operations on a keyboard as follows:

for a character of 4 strokes or fewer, extracting a first and a last code elements according to the handwriting sequence;

for a single block character of 5 strokes or more, extracting a first, a second and a last code elements, totally 3 code elements according to the handwriting sequence; and for a separated block character of 5 strokes or more, dividing the character into two blocks, and extracting a first and a last code elements from each block respectively; then striking the keys corresponding to the extracted code elements, or striking the code-ending key when the number of the extracted code elements is less than 4;

wherein the keyboard is a standard keyboard on which said corresponding keys being struck, and said two-stroke form code elements extracted from the character are arranged to correspond to each other in accordance with the following combination relations:

| | | | | | | | | | |
|---|---|---|---|---|---|---|---|---|---|
| ノ ㄥ Q | ノ \ W | ノ ノ E 月 | ノ \| R | ノ — T | \ — Y 工 | \ \| U 人阝 | \ ノ I く | \ \ O | \ ㄥ P 大 |
| — ㄥ A 虫立 | — \ S 扌乂田 | — ノ D 又 | — \| F | — — G | \| — H ク | \| \| J 艹 | \| ノ K 木 | \| \ L 日疒 | 八 ; 金 辶鳥 |
| ㄥ ㄥ Z 十 | ㄥ \ X 钅 | ㄥ ノ C 土 | ㄥ \| V 山 | ㄥ — B 火 | N 口 | \| ㄥ M 小 | , | . | / |

and wherein a method for dividing said separated block characters is:

i. for a character of Up-down construction, a group of strokes first completed from left to right in handwriting sequence form a beginning block, and the other strokes form an end block;

ii. for a character of Left-right construction, a group of strokes first completed in handwriting sequence form an beginning block, and the other strokes form an end block;

iii. for a character of Embracing construction which is divided into an embracing block and an embraced block, a group of strokes first completed in handwriting sequence form a beginning block, and the other strokes form an end block.

3. A method for inputting Chinese characters using the keyboard according to claim 1, comprising the following steps:

i. composing 25 two-stroke form code elements based upon basic strokes which form Chinese characters, that is:

classifying single strokes which construct Chinese characters into 5 types: horizontal, vertical, left-falling, right-falling and turning strokes, which can be symbolized as — | ノ \ ㄥ; and combining every two of said 5 types of strokes together to form two-stroke form code elements, the number of which is altogether 5*5=25, and which are represented as:

| | | | | |
|---|---|---|---|---|
| —— | —\| | —ノ | —\ | —ㄥ |
| \|— | \|\| | \|ノ | \|\ | \|ㄥ |
| ノ— | ノ\| | ノノ | ノ\ | ノㄥ |
| \— | \\| | \ノ | \\ | \ㄥ |
| ㄥ— | ㄥ\| | ㄥノ | ㄥ\ | ㄥㄥ |

ii. selecting the following 25 two-stroke symbol code elements from frequently used basic components of Chinese characters:

日月人工木 阝く大虫立扌乂田又ク艹疒辶 十钅 土山火口小 iii. performing input operations on a keyboard as follows:

for a character of 4 strokes or fewer, extracting a first and a last code elements according to handwriting sequence;

for a single block character of 5 strokes or more, extracting a first, a second and a last code elements, totally 3 code elements according to handwriting sequence; and for a separated block character of 5 strokes or more, dividing the character into two blocks, and extracting only a first code elements from the beginning block, and a first and last code elements from the end block;

then striking the keys corresponding to the extracted code elements, or striking the code-ending key when the number of the extracted code elements is less than 3;

wherein the keyboard is a standard keyboard on which said corresponding keys being struck, and said code elements extracted from the character are arranged to correspond to each other in accordance with the following combination relations:

| | | | | | | | | | |
|---|---|---|---|---|---|---|---|---|---|
| 丿∠ | 丿\ | 丿丿 | 丿丨 | 丿一 | \一 | \丨 | \丿 | \\ | \∠ |
| O | W | E | R | T | Y | U | I | O | P |
| | | 月 | | | 工 | 人阝 | 〈 | | 大 |
| 一∠ | 一\ | 一丿 | 一丨 | 一一 | 丨一 | 丨丨 | 丨丿 | 丨\ | |
| A | S | D | F | G | H | J | K | L | ; |
| 虫立 | 扌乄田 | 又 | | | ク | 艹 | 木 | 日广 | 辶 |
| ∠∠ | ∠\ | ∠丿 | ∠丨 | ∠一 | | 丨∠ | | | |
| Z | X | C | V | B | N | M | , | . | / |
| 十 | 钅 | 土 | 山 | 火 | 口 | 小 | | | |

and wherein said method for dividing said separated block characters is as follows:

i. for a character of Up-down construction, a group of strokes first completed from left to right in handwriting sequence form the beginning block, and the other strokes form the end block;

ii. for a character of Left-right construction, a group of strokes first completed in handwriting sequence form the beginning block, and the other strokes form the end block;

iii. for a character of Embracing construction which is divided into an embracing block and an embraced block, a group of strokes first completed in handwriting sequence form the beginning block, and the other strokes form the end block.

4. A method for inputting Chinese characters using the keyboard according to claim 1, comprising the following steps:

i. composing 25 two-stroke form code elements based upon basic strokes which form Chinese characters, that is, classifying the single stroke which construct Chinese characters into 5 types: horizontal, vertical, left-falling, right-falling and turning strokes, which can be symbolized as 一丨丿\∠; and combining every two of said five types of strokes together to form two-stroke form code elements, the number of which is altogether 5*5=25, and which are represented as:

| | | | | |
|---|---|---|---|---|
| 一一 | 一丨 | 一丿 | 一\ | 一∠ |
| 丨一 | 丨丨 | 丨丿 | 丨\ | 丨∠ |
| 丿一 | 丿丨 | 丿丿 | 丿\ | 丿∠ |
| \一 | \丨 | \丿 | \\ | \∠ |
| ∠一 | ∠丨 | ∠丿 | ∠\ | ∠∠ |

ii. selecting the following 25 two-stroke symbol code elements from the frequently used structural components of Chinese characters, that is:

日月人 工木 阝〈 大虫 立扌 乄田又ク艹广辶 十钅 土山火口小 iii. performing input operations on a keyboard as follows:

for a character of 4 strokes or fewer, extracting a first letter of the standard phonetic alphabet combination, and a first code element of the character according to handwriting sequence;

for a character of 5 strokes or more, extracting a first letter of the standard phonetic alphabet combination, and a first code element and a last code element of said character;

then striking the keys corresponding to the extracted code elements, or striking the code-ending key when the number of the code elements is less than 3 wherein the keyboard is a standard keyboard on which said corresponding keys being struck, and said code elements extracted from the character are arranged to correspond to each other in accordance with the following combination relations:

| | | | | | | | | | |
|---|---|---|---|---|---|---|---|---|---|
| 丿∠ | 丿\ | 丿丿 | 丿丨 | 丿一 | \一 | \丨 | \丿 | \\ | \∠ |
| O | W | E | R | T | Y | U | I | O | P |
| | | 月 | | | 工 | 人阝 | 〈 | | 大 |
| 一∠ | 一\ | 一丿 | 一丨 | 一一 | 丨一 | 丨丨 | 丨丿 | 丨\ | |
| A | S | D | F | G | H | J | K | L | ; |
| 虫立 | 扌乄田 | 又 | | | ク | 艹 | 木 | 日广 | 辶 |
| ∠∠ | ∠\ | ∠丿 | ∠丨 | ∠一 | | 丨∠ | | | |
| Z | X | C | V | B | N | M | , | . | / |
| 十 | 钅 | 土 | 山 | 火 | 口 | 小 | | | |

* * * * *